(12) United States Patent
Richards et al.

(10) Patent No.: US 6,237,146 B1
(45) Date of Patent: May 22, 2001

(54) SYSTEM AND METHOD OF BIDIRECTIONAL DIGITAL VIDEO COMMUNICATION OVER A CABLE

(75) Inventors: Claudia K. Richards; William M. Buchanan, both of Hampstead, NH (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/820,734

(22) Filed: Mar. 19, 1997

(51) Int. Cl.[7] ................................................. H04N 7/173
(52) U.S. Cl. .................... 725/100; 725/131; 725/132; 370/448
(58) Field of Search ........................... 709/217–219; 348/6, 7, 12, 13, 10; 455/3.1, 4.1, 4.2, 5.1, 6.1, 6.2; 370/445, 446, 447, 448; 725/114, 131, 132, 91, 100, 103, 86

(56) References Cited

U.S. PATENT DOCUMENTS 4,633,462 * 12/1986 Stifle et al. ........................... 370/448
5,572,517 * 11/1996 Safadi ............................... 455/5.1 X
5,696,765 * 12/1997 Safadi ............................... 455/5.1 X \* cited by examiner Primary Examiner—John W. Miller
(74) Attorney, Agent, or Firm—Morgan & Finnegan LLP

(57) ABSTRACT

In accordance with the present invention, a cable system allows bidirectional digital communication between a plurality of subscriber Digital Video Home Terminals each located at a different subscriber location and a cable headend via a RF Trunk. The cable headend has a processor for calculating and storing a randomized back-off array for each of the plurality of subscriber Digital Video Home Terminals. Each subscriber Digital Video Home Terminal receives the randomized back-off array for controlling through an algorithm when a Digital Video Home Terminal attempts to send a message to a cable headend. If a collision between the two messages is imminent, the last Digital Video Home Terminal to send the message backs-off and then reattempts to send the message a plurality of times after a random back-off interval of time has passed after each reattempt until no collision would occur with another message generated from a different Digital Video Home Terminal.

20 Claims, 3 Drawing Sheets

SYSTEM AND METHOD OF BIDIRECTIONAL DIGITAL VIDEO COMMUNICATION OVER A CABLE

FIELD OF THE INVENTION

This invention relates to a system and method of bidirectional digital video communication over a cable that permits bidirectional communication between a cable headend and subscriber home terminals (e.g., Set-Top Boxes) with minimum message collisions.

BACKGROUND OF THE INVENTION

Cable television is becoming more popular and millions of homes use and receive analog cable signals from a cable supplier to watch favorite programs and in some instances receive other information. Typically, each subscriber has a Set-Top Box, (also referred to as a Home Terminal) that rests on the standard television and receives from the cable headend down-stream transmissions such television shows. The cable headend typically has a connection to a national programming supplier such as a television network.

Advances in communication are now making possible the use of digital video or EPPV/VOD products that allow cable suppliers to offer enhanced pay-per-view (EPPV) and video-on-demand (VOD) services while having a digital network solution. By using a digital network, the use of out-of-band signaling capabilities are now possible as well as video and audio transmission in both the uplink and downlink direction. It is now possible to have a digital video Set-Top Box or Digital Video Home Terminal that can receive down-stream transmissions and transmit upstream signals as necessary.

With the use of a digital network and RF Trunk, it is possible for hundreds of Digital Video Home Terminals to reside on one RF Trunk. With the use of hundreds of Digital Video Home Terminals that can generate a message upstream to the cable headend, it is possible for message collisions to occur when two or more Digital Video Home Terminals send a message about the same time, requesting video programming or other information and services. It is therefore necessary to design a system using Digital Video Home Terminals that avoids collisions with messages generated from various Digital Video Home Terminals located at different subscriber premises. Additionally, any solution to this problem should require little processing power and memory within the Digital Video Home Terminal or Set-Top Box to reduce the cost, size and complexity of Set-Top Box. To reduce the overall cost of the system to the subscriber, it is desirable that any major processing to avoid message collision be accomplished at the cable headend.

SUMMARY OF THE INVENTION

In accordance with the present invention, a cable system now permits bidirectional digital communication between a cable headend and a plurality of subscriber Digital Video Home Terminals each located at a different subscriber location such as a subscriber residence. The cable headend includes a processor for calculating and generating a randomized back-off array for each of the plurality of subscriber Digital Video Home Terminals. An RF Trunk line interconnects the cable headend and the plurality of subscriber home terminals so that messages from a subscriber can be sent to the cable headend and digital video or other information can be sent to the subscriber.

Each subscriber Digital Video Home Terminal includes a processor which receives from the cable headend a randomized back-off array for controlling when a Digital Video Home Terminal attempts to send a message to a cable headend and then reattempts to send the message a plurality of times after a random back-off interval of time has passed after each reattempt until no collision with another message is generated from a different home terminal.

In one aspect of the present invention, each Digital Video Home Terminal includes means for initializing communication with the cable headend when the randomized back-off array is received from the cable headend. In still another aspect of the present invention, a Digital Video Home Terminal includes Random Access Memory for storing the back-off array within the Random Access Memory of the Digital Video Home Terminal. The back-off array received from the cable headend allows reattempted message transmissions after a respective time-out period has elapsed that comprises a first randomized interval of time and then allows reattempted message transmission after another time-out period that comprises a second randomized interval of time. The first randomized interval of time is calculated from a uniformly distributed retry algorithm that is part of the back-off array and the second randomized period of time is calculated from an exponential period of time. The processor cable headend can also include circuitry for generating an acknowledgment to a subscriber Digital Video Home Terminal after the cable headend has received a message from the Digital Video Home Terminal. In an another aspect of the present invention the Digital Video Home Terminal is responsive whenever an acknowledgment is not received so that the Digital Video Home Terminal reattempts a message transmission to the cable headend pursuant to the random back-off interval of time. The trunk line interconnecting the cable headend and the plurality of subscriber Digital Video Home Terminals typically comprises an RF Trunk line.

BRIEF DESCRIPTION OF THE DRAWINGS

This invention and its mode of operation will be more clearly understood from the following detailed description when read with the appended drawings in which.

DETAILED DESCRIPTION OF THE INVENTION

Figure 1:
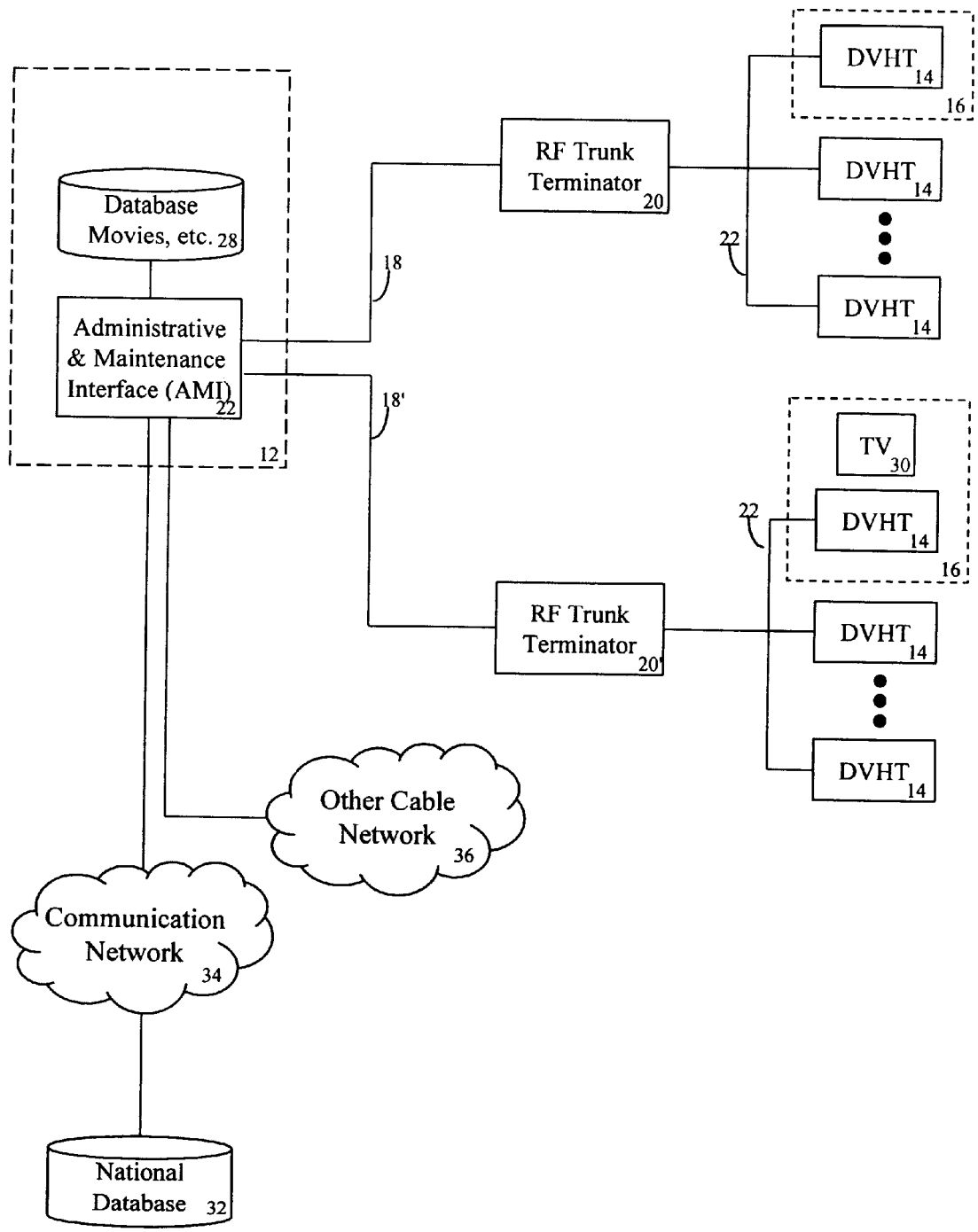
FIG. 1 shows a simplified block diagram of the general environment of the cable system allowing bidirectional digital video communication over a cable in accordance with the present invention.

Referring now to FIG. 1, there is illustrated a cable system indicated generally at 10 and in accordance with the present invention that allows bidirectional digital video communication between a cable headend indicated generally at 12 and a plurality of different subscriber Digital Video Home Terminals (DVHT) 14 located at different subscriber locations such as a premises indicated by a dotted line 16 and in communication with the cable headend 12 via an RF Trunk 18. In the illustrated embodiment, each RF Trunk 18 includes an RF Trunk Terminator 20 and a digital communication line 22 that connects the RF Trunk Terminator 20 to typically hundreds of different subscriber Digital Video Home Terminals 14. In the illustrated embodiment, two RF Trunks 18, 18' are shown, and extend from the cable headend 12 to two RF Trunk Terminators 20, 20'.

Figure 2:
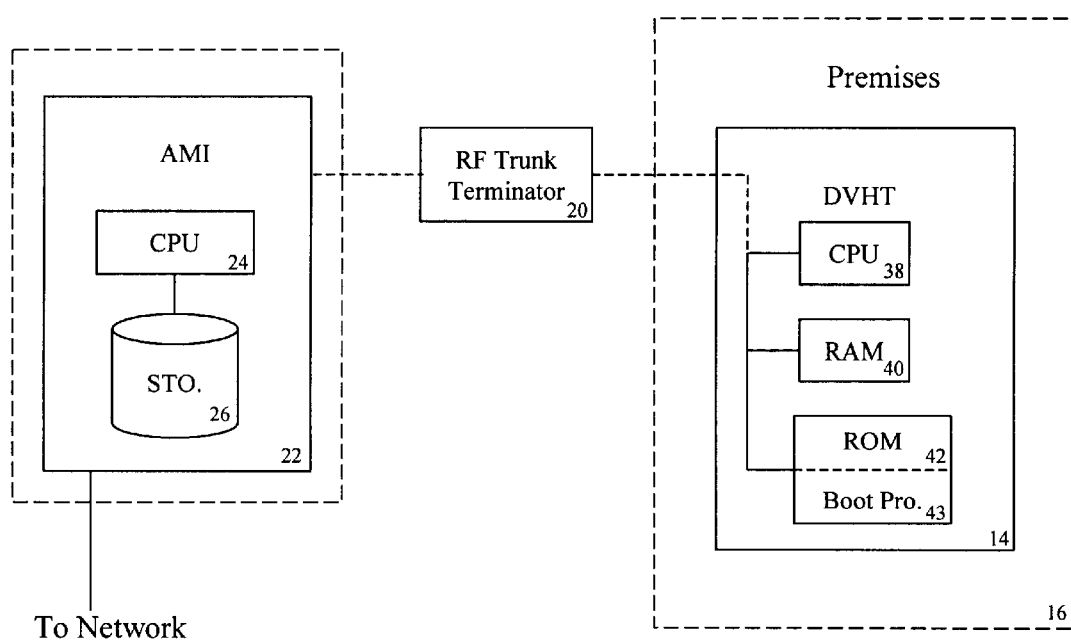
FIG. 2 shows a more detailed view of a premises based Digital Video Home Terminal and the cable headend.

The cable headend 12 typically includes an Administration and Maintenance Interface (AMI) 23 that includes the processing power for generating randomized back-off arrays within its large central processing unit 24 and storage memory 26. (FIG. 2). Each DVHT 14 has its own back-off array, which the AMI 23 downloads to the DVHT 14.

The AMI 23 can include a separate database 28 of different stored programs such as video programs that are then transmitted along the RF Trunk 18 to a subscriber premises 16 where the DVHT 14, (typically a Set-Top Box) is situated on a television set 30. The DVHT 14 and AMI 23 can uplink and download digital messages and other information such as Set-Top Provision Information, Set-Top Box Status and other billing information. Programs could also be downloaded, as well as status checks and alarms to and from the AMI 23 through the RF Trunk 18. Some messages can include a request for a cable television program and even more complex requests or messages that allow the AMI 23 to access other databases such as national database 32 via communication network 34 or a nationally syndicated cable or television program from another cable network 36.

Table 1 below shows a summary of various messages that can go into and out of the DVHT. The messages are divided into three functional areas:

a. Access Network OAM&P messages—these are the messages that are required to support the physical and logical functioning of the out-of-band message transport system. These messages are supported by the AMI and the Message Router.

b. Service OAM&P messages—these are messages that are required to support services in the DVHT such as software downloads, parameter provisioning and security messages. These messages are supported by the Server and the KMS.

c. Application Control and Support messages—these are messages to control and support the application (menus) running in the DVHT, such as purchase events, program termination requests, and motion control requests. These messages are supported by the Server.

TABLE 1

DVHT Message Summary

Access Network OAM&P Messages

| Page # and Message Name | Direction | object_id | op_code | Comments/Addressing Mode if not HDLC point-to-point |
|---|---|---|---|---|
| 34 PING | AMI>DVHT(MAINT) | 8192 | 1 | |
| 35 SET_FREQ | AMI>DVHT(MAINT) | 8192 | 2 | Set RF Frequency |
| 36 SET_POWER | AMI>DVHT(MAINT) | 8192 | 3 | Set RF Modem Power |
| 37 SET_ALOHA_PARMS | AMI>DVHT(MAINT) | 8192 | 4 | Set Aloha Retry Parameters |
| 38 SET_MSG_SEQ | AMI>DVHT(MAINT) | 8192 | 5 | Set Message Sequence Number |
| 39 SET_HDLC_ADDR | AMI>DVHT(MAINT) | 8192 | 7 | Sets DVHT HDLC address |
| 40 MODEM_ON | AMI>DVHT(MAINT) | 8192 | 9 | Enable/Disable RF Modem |
| 41 POWER_CAL | MR>DVHT(MAINT) | 8192 | 10 | Start/stop power calibration flags |
| 43 CLEAR_ERRORS | AMI>DVHT(MAINT) | 8192 | 12 | |
| 44 ATT_PROVISION | AMI>DVHT(MAINT) | 8192 | 13 | AMI Registration message HDLC broadcast address with DVHT_ID match |
| 46 GET_DVHT_MAKEMODEL | AMI>DVHT(MAINT) | 8192 | 14 | Get DVHT ID HDLC broadcast address with DVHT_ID match |
| 47 GET_STATUS | AMI>DVHT(MAINT) | 8192 | 15 | To locate a DVHT |
| 49 UNREGISTER | AMI>DVHT(MAINT) Server (SMS) >DVHT(MAINT) | 8192 | 16 | Set the DVHT to its unregistered state |
| 50 SOFT_BOOT | AMI>DVHT(MAINT) Server (SMS) >DVHT(MAINT) | 8192 | 20 | Reset DVHT parameter, but retain its registration parameters. |
| 51 SET_FRAG_PARMS | AMI>DVHT(MAINT) | 8192 | 21 | Set Fragmentation Parameters |
| 52 CLEAR_DIAG_ERRORS | AMI>DVHT(MAINT) | 8192 | 24 | Clear diagnostic errors |
| 53 FIND_DVHT | AMI>DVHT(MAINT) | 8192 | 25 | Find DVHT with matching dvht_id, HDLC broadcast address with DVHT_ID match |
| 55 GENERICREPLY | DVHT(MAINT)>AMI | echo | echo | |
| 56 PINGREPLY | DVHT(MAINT)>AMI | 8192 | echo | |
| 57 GET_DVHT_MAKEMODEL-REPLY | DVHT(MAINT)>AMI | 8192 | echo | Contains DVHT Make, Model number, IP address, and idle address |
| 58 GET_STATUSREPLY | DVHT(MAINT)>AMI DVHT(MAINT)>MSGRTR | 8192 | echo | Contains DVHT status |
| 62 FIND_DVHTREPLY | DVHT(MAINT)>AMI | 8192 | echo | Returns matching DVHT_ID |

| Page # and Message Name | Direction | | op_code | Comments |
|---|---|---|---|---|
| | Service OAM&P Messages | | | |
| 64 KMSGET_PUBKEY | KMS>DVHT(CRYPT) | 4096 | 1 | KMS registration data |
| 65 NEWUEV | KMS>DVHT(CRYPT) | 4096 | 2 | Update the UEV |
| 66 REKEY | KMS>DVHT(CRYPT) | 4096 | 3 | Change the keys |
| 68 KMSGET_PUBKEYREPLY | DVHT(CRYPT)>KMS | 4096 | echo | |
| 69 NEWUEVREPLY | DVHT(CRYPT)>KMS | 4096 | echo | |
| 70 REKEYREPLY | DVHT(CRYPT)>KMS | 4096 | echo | |
| 72 RTE_CLEARPINS | Server(SMS)>DVHT(RTE) | 1 | 1 | Clear the PINs |
| 73 RTE_SETFLAGS | Server(SMS)>DVHT(RTE) | 1 | 2 | Set/Clear RTE flags |
| 74 RTE_STATUS | Server(NMS)>DVHT(RTE) | 1 | 3 | Get the RTE Status |
| 75 RTE_SETENV | Server(ASM)>DVHT(RTE) | 1 | 4 | Set RTE environment variables |
| 77 RTE_PROVISION | Server(REG)>DVHT(RTE) | 1 | 5 | Load RTE provisioning data |

TABLE 1-continued

DVHT Message Summary

| | | | | |
|---|---|---|---|---|
| 79 IR_PROVISION | Server (Reg)>DVHT(REG) | 16384 | 4 | Provision IR Blaster Codes |
| 80 SYSPROVISION | Server (Reg)>DVHT(REG) | 16384 | 3 | Set provisioned system variables |
| 81 DOWNLOAD_EXECUTE | Server (UPD)>DVHT(UPG) | 12288 | 2 | Download new SW image |
| 83 DOWNLOAD_EXECUTE_REPLY | DVHT(UPG)>Server(UPD) | 12288 | echo | |
| 84 DOWNLOAD_PREPARE | Server(REG)>DVHT(UPG) | 12288 | 1 | |
| 85 DOWNLOAD_PREPARE_REPLY | DVHT(UPG)>Server(UPD) | 12288 | echo | |
| 87 SET_IP_ADDR | Server(REG)>DVHT(MAINT) | 8192 | 8 | Set DVHT In-Band IP address |
| 89 RTESTATUSREPLY | DVHT(RTE)>Server(NMS) | 1 | echo | |
| Application Support Messages, Out-of-Band | | | | |
| 92 ASPRESP | Server(ASM)>DVHT(APP) | 2 | echo | Response to Application Request |
| 93 ASPBUYRESP | Server(ASM)>DVHT(APP) | 2 | echo | Response to Buy Request |
| 94 ASPPVURESP | Server(ASM)>DVHT(APP) | 2 | echo | Response to Pre-view Request |
| 97 ASPBUYREQ | DVHT(APP)>Server(ASM) | 2 | 1 | Program Buy Request |
| 98 ASPTERMREQ | DVHT(APP)>Server(ASM) | 2 | 2 | Program Terminate Request |
| 100 ASPMCREQ | DVHT(APP)>Server(ASM) | 2 | 3 | Motion Control Request |
| 101 ASPRTREQ | DVHT(APP)>Server(ASM) | 2 | 4 | Program Restart Request |
| 104 ASPPVUREQ | DVHT(APP)>Server(ASM) | 2 | 5 | Pre-view Report |
| Application Support Messages, In-Band | | | | |
| 106 Application Tables Types | Server(ADM)>DVHT(APP) | var | 1 | Directory of broadcast media and data with RF tuning and PID info |
| 110 Application List Table (ALT) | Server(ADM)>DVHT(APP) | var | 2 | Tabular information supporting hierarchical APP menu structure |

It is evident that the type of messages can vary widely, including Frequency and Modem information (as known to those skilled in the art); Retry parameters; Digital Address information; Modem Enable and Disable commands; Power calibration; Registration messages; Diagnostic checks; Model information and addresses; PINs for security; images of products and advertisements; accounting; and Pay-per-view matters.

In accordance with one aspect of the invention, the DVHT 14 includes a processor (e.g., central processing unit) 38 and Random Access Memory (RAM) 40 connected to the processor (FIG. 2). Also, Read Only Memory (ROM) 42 has a boot program 43 that is operable when the DVHT 14 is initially turned on. The boot program 43 loads and allows the first part of an initialization of the DVHT 14 with the AMI 23. During the initialization of the DVHT 14, the AMI 23 then transmits along the RF Trunk 18 to the initializing DVHT 14 the particular back-off array used for controlling the DVHT's attempts and reattempts in sending messages to the AMI 23 without collision with other messages from another subscriber DVHT. This "Boot" program 43 allows registration of the DVHT 14 with the AMI 23.

At the time that a DVHT 14 is registered within the AMI 23 of the cable system 10, the DVHT has been initialized with a randomized back-off array. This approach consolidates back-off algorithm administration and more readily allows for future requirements regarding upstream congestion control such as when numerous DVHT's are sending messages at one time. In addition, this solution saves on DVHT memory and cost because large processing and memory units will not be necessary in a DVHT 14.

This random back-off will consist of two algorithms:
1. A quick, uniformly distributed retry algorithm will be used for the first 5 retries and is defined as:
   wait_on_aloha_ack_interval+iuniform[0–100 ms]
2. An exponential retry algorithm will be used for the last 5 retries and is defined as:
   wait_on_aloha_ack_interval+2 **#retries*iuniform[0–1,000 ms]
   (taking into account the number of collisions, i.e., the larger the number of collisions, the longer the random back-off interval)

The array that is sent to the DVHT at the time of initialization will consist of 11 three-byte shorts. Each row entry maps to a retry time-out interval in milliseconds.

The back-off array will be defined as:
Row 0—0th retry: wait_on_aloha_ack_interval+iuniform[0–50]
Row 1—1st retry: wait_on_aloha_ack_interval+iuniform[0–50]
Row 5—5th retry: wait_on_aloha_ack_interval+iuniform[0–50]
Row 6—6th retry: wait_on_aloha_ack_interval+2**6* iuniform[0–1,000] Row 7—7th retry: wait_on_aloha_ack_interval+2**7* iuniform[0–1,000]
Row 10—10th retry: wait_on_aloha_ack_interval+2**10* iuniform[0–1,000]

In reattempting message transmissions, typically, the first set of message transmissions are reattempted after a respective time-out. That is a first randomized interval of time such as between 0 to 100 milliseconds. After these first reattempts, the DVHT then reattempts message transmission after a respective time-out. That is a second randomized interval of time such as between 0 to 1,000 milliseconds. The randomized interval of time can be calculated from a uniformly distributed retry algorithm and the second randomized interval of time can be calculated from exponential retry algorithm.

Each row entry is a 16 bit number representing time in milliseconds.

It is evident that this randomization function is now done at the cable headend 12 instead of a more traditional method where randomization is accomplished by the entity that is transmitting the messages in traffic (e.g., in the present invention the DVHT 14). However, as noted before, the DVHT 14 (Set-Top Box) should have minimal memory and CPU needs in order to reduce the cost and complexity of the unit. Thus, the DVHT will be more attractive for use by subscribers such as typically found in a one family household.

Figure 3:
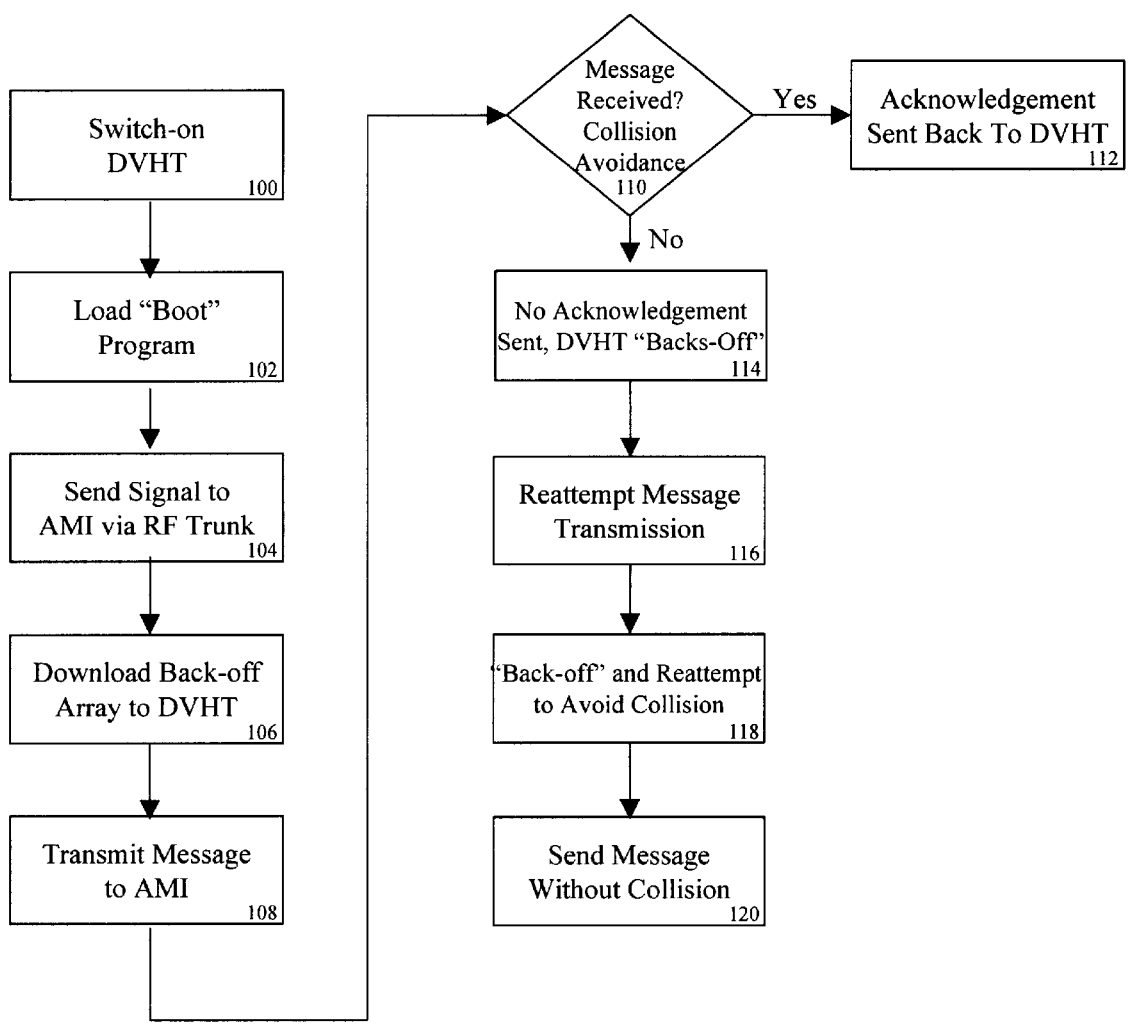
FIG. 3 illustrates a flow chart showing one typical method in accordance with the present invention.

FIG. 3 illustrates a flow chart showing one basic high level method of operation of the present invention. At the outset, the subscriber "switches-on" the DVHT 14 (Block 100) and begins the initialization process. A "boot" program loads (Block 102) and a signal is sent by the DVHT 14 through the RF Trunk Terminator 20 and RF Trunk 18 to the AMI (Block 104) to signal the AMI to transmit the randomized back-off array to the DVHT 14. The AMI 23 then forwards the back-off array to the RAM 40 of the DVHT (Block 106). A message is then transmitted by the DVHT 14 to the AMI (Block 108). If the AMI 23 receives the message (Block 110), an acknowledgement is sent back to the DVHT 14 (Block 112) and a cable movie or other information may follow.

If an acknowledgement is not received back by the DVHT (Block 114), the DVHT then backs-off a first randomized interval of time and then reattempts the message transmission (Block 116). If a collision is imminent again, the DVHT backs off again and then reattempts transmission based on randomized intervals of time between "0" and some time period (Block 118). The first random interval of time could be between 0 and 100 milliseconds. After about five tries, the random period of time could then be extended to as high as 0 to 1,000 milliseconds. At that time, no collisions should be imminent and a message transmitted without collision (Block 120). Waiting time, however, could be excessive by the time the sixth, seventh or eighth retry occurs.

It is evident that the present invention now provides a digital video and enhanced pay-per-view and video-on-demand service that accommodates a collision based network. The overall cost of a DVHT used in a premises is reduced by the use of having the cable headend calculate a back-off array for controlling a Digital Video Home Terminal.

What has been described as merely illustrative of present invention. Other applications other than the disclosed system the method or contemplated as being within the knowledge one skilled in the art may be utilized without departing from the spirit and scope of the present invention.

That which is claimed is:

1. A method of bidirectional digital communication over cable comprising the step of:
   receiving, in response to an initialization signal, within each of a plurality of different subscriber digital video home terminals located at different subscriber locations and in communication with a cable headend a randomized back-off array for controlling when a subscriber digital video home terminal attempts to send a message to the cable headend and then reattempts to send the message a plurality of times after a random back-off interval of time has passed after each reattempt until no collision would occur with another message generated from another subscriber home terminal, the randomized back-off array being generated at the cable headend with a two-stage back-off retry algorithm.

2. A method according to claim 1 including the step of generating the randomized back-off array at the cable headend and initializing the digital video home terminal with the randomized back-off array so that the digital video home terminal can establish communication with the cable headend.

3. A method according to claim 1 including the step of storing the back-off array within a Random Access Memory of the digital video home terminal.

4. A method according to claim 1 including the step of reattempting message transmissions after a respective time-out period that is a first randomized interval of time and then reattempting message transmissions after a respective time-out period that is a second randomized interval of time.

5. A method according to claim 1 wherein the first randomized interval of time is calculated from a uniformly distributed retry algorithm and the second randomized interval of time is calculated from an exponential retry algorithm.

6. A method according to claim 1 including the step of reattempting to send a message if an acknowledgement of message receipt is not received from the cable headend.

7. A method of bidirectional digital communication along a cable comprising the steps of:
   initializing communication with a cable headend by booting a subscriber digital video home terminal located at a subscriber premises and receiving from the cable headend a randomized back-off array that is used to calculate random back-off intervals of time, the randomized back-off array being generated at the cable headend with a two-stage back-off retry algorithm,
   attempting to send a message to the cable headend and backing-off from sending the message if a collision with another message generated from a different subscriber digital video home terminal would occur, and
   reattempting to send the message a plurality of times after a random back-off interval of time has passed until no collision would occur with another message generated from a different home terminal.

8. A method according to claim 7 including the step of generating the back-off array at the cable headend.

9. A method according to claim 7 including the step of storing the back-off array within a Random Access Memory of the digital video home terminal.

10. A method according to claim 7 including the step of reattempting to send a message if an acknowledgement is not received from the cable headend.

11. A method according to claim 7 including the step of reattempting message transmissions after a respective time-out period that is a first randomized interval of time and then reattempting message transmissions after a respective time-out period that is a second randomized interval of time.

12. A method according to claim 7 wherein the first randomized interval of time is calculated from a uniformly distributed retry algorithm and the second randomized interval of time is calculated from an exponential retry algorithm.

13. A cable system that permits bidirectional digital communication along a cable with minimum message collisions comprising:
   a plurality of subscriber digital video home terminals each located at a different subscriber location,
   a cable headend having a processing means for calculating and storing a randomized back-off array for each of the plurality of subscriber home terminals, wherein the randomized back-off array is generated with a two-stage back-off retry algorithm,
   a trunk line interconnecting the cable headend and the plurality of subscriber digital video home terminals through which messages from a subscriber can be sent to the cable headend and digital video can be sent to the subscriber,
   and wherein each subscriber digital video home terminal includes means for receiving a randomized back-off array from the cable headend for controlling when a digital video home terminal attempts to send a message to the cable headend and then reattempts to send the message a plurality of times after a randomized back-off interval of time has passed after each reattempt until no collision would occur with another message generated from a different digital video home terminal.

14. A system according to claim 13 wherein each digital video home terminal includes means for initializing communication with the cable headend when the randomized back-off array is received from the cable headend.

15. A system according to claim 13 wherein a digital video home terminal includes Random Access Memory for storing the back-off array within the Random Access Memory of the digital video home terminal.

16. A system according to claim 13 wherein the back-off array received from the cable headend allows reattempted message transmissions after a respective time-out interval that comprises a first randomized interval of time and then allows reattempted message transmissions after a respective time-out period that comprises a second randomized interval of time.

17. A system according to claim 13 wherein the first randomized interval of time is calculated from a uniformly distributed retry algorithm and the second randomized interval of time is calculated from an exponential period of time.

18. A system according to claim 13 wherein said processor at the cable headend includes means for generating an acknowledgement to a subscriber digital video home terminal after the cable headend has received a message from the digital video home terminal.

19. A system according to claim 13 wherein said digital video home terminal includes means responsive to when an acknowledgement is not received so that a digital video home terminal reattempts a message transmission to the cable headend pursuant to a calculated random back-off interval of time.

20. A system according to claim 13 wherein said trunk line interconnecting the cable headend and the plurality of subscriber digital video home terminals comprises an RF Trunk line.

* * * * *